(12) United States Patent
Ganesan et al.

(10) Patent No.: US 8,745,427 B2
(45) Date of Patent: Jun. 3, 2014

(54) MEMORY LINK POWER MANAGEMENT (75) Inventors: Baskaran Ganesan, Bangalore (IN);
Suresh Sugumar, Bangalore (IN);
Vijayanand Naik, Bangalore (IN);
Tessil Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 13/206,923

(22) Filed: Aug. 10, 2011

(65) Prior Publication Data

US 2013/0042126 A1    Feb. 14, 2013

(51) Int. Cl.
*G06F 1/32* (2006.01)
(52) U.S. Cl.
USPC ............ 713/320; 713/321; 713/323; 711/105
(58) Field of Classification Search
USPC ............................. 713/320, 321, 323; 711/105
See application file for complete search history.

(56) References Cited

U.S. PATENT DOCUMENTS

| | | | |
|---|---|---|---|
| 7,028,200 B2* | 4/2006 | Ma | 713/324 |
| 7,924,727 B2* | 4/2011 | MacDonald | 370/238 |
| 2012/0124398 A1* | 5/2012 | Diab | 713/310 |
| 2012/0233473 A1* | 9/2012 | Vasseur et al. | 713/300 |

* cited by examiner

*Primary Examiner* — Thuan Du
(74) *Attorney, Agent, or Firm* — Blakely, Sokoloff, Taylor & Zafman LLP (57) ABSTRACT

Embodiments of the invention describe systems and processes directed towards improving link power-management during memory subsystem idle states. Embodiments of the invention control memory link operations when various components of a memory subsystem enter low power states under certain operating conditions. Embodiments of the invention similarly describe exiting low power states for memory links and various components of a memory subsystem upon detecting certain operating conditions.

Embodiments of the invention may detect operating conditions in a computing system. Some of these operating conditions may include, but are not limited to, a memory controller being empty of transactions directed towards a memory unit, a processor core executing a processor low-power mode, and a processor socket executing an idle mode. In response to detecting said operating conditions, embodiments of the invention may execute a low-power idle state for the memory unit and various components of the memory subsystem.

20 Claims, 7 Drawing Sheets

MEMORY LINK POWER MANAGEMENT

FIELD

Embodiments of the invention generally pertain to computing devices and more particularly to memory system power management.

BACKGROUND

Increasing workload demands have created the need for high capacity, high performance memory subsystems in system platforms. Memory subsystems in multi-processor (or multi-core) servers, such as 4-socket and 8-socket server configurations, typically include large amounts of main memory capacity.

Current high capacity memory subsystem solutions result in high power consumption even when the system platform is completely idle. The result is that memory subsystem idle power is a significant component of the overall system platform idle power consumption. There is an increasing demand for significant reduction in system platform idle power consumption. What is needed is a solution to reduce the memory subsystem idle power consumption, and thereby reducing the overall system platform idle power consumption, without adversely affecting system memory links and without sacrificing memory performance.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

Embodiments of the invention describe systems and processes directed towards improving link power-management during memory subsystem idle states. Embodiments of the invention control memory link power consumption when various components of a memory subsystem enter low power states under certain operating conditions. Embodiments of the invention similarly describe exiting low power states for memory links and various components of a memory subsystem upon detecting certain operating conditions.

Embodiments of the invention may comprise logic, modules or any combination thereof, to detect operating conditions in a computing system. Some of these operating conditions may include, but are not limited to, a memory controller being empty of transactions directed towards a memory unit, a processor core executing a processor low-power mode, and a processor socket (operatively coupling the processing core and the memory unit) executing an idle mode. In response to detecting said operating conditions, embodiments of the invention may execute a low-power idle state for the memory unit and various components of the memory subsystem.

It is to be understood, in view of the example embodiments described below, that system platforms implementing embodiments of the invention consume less power during system idle time compared to prior art solutions, while improving the life of memory links and devices through efficient power management during system idle time. Furthermore, by having an efficient exit solution for the low power idle state, the performance of memory subsystems incorporating embodiments of the invention will not be affected.

Figure 1:
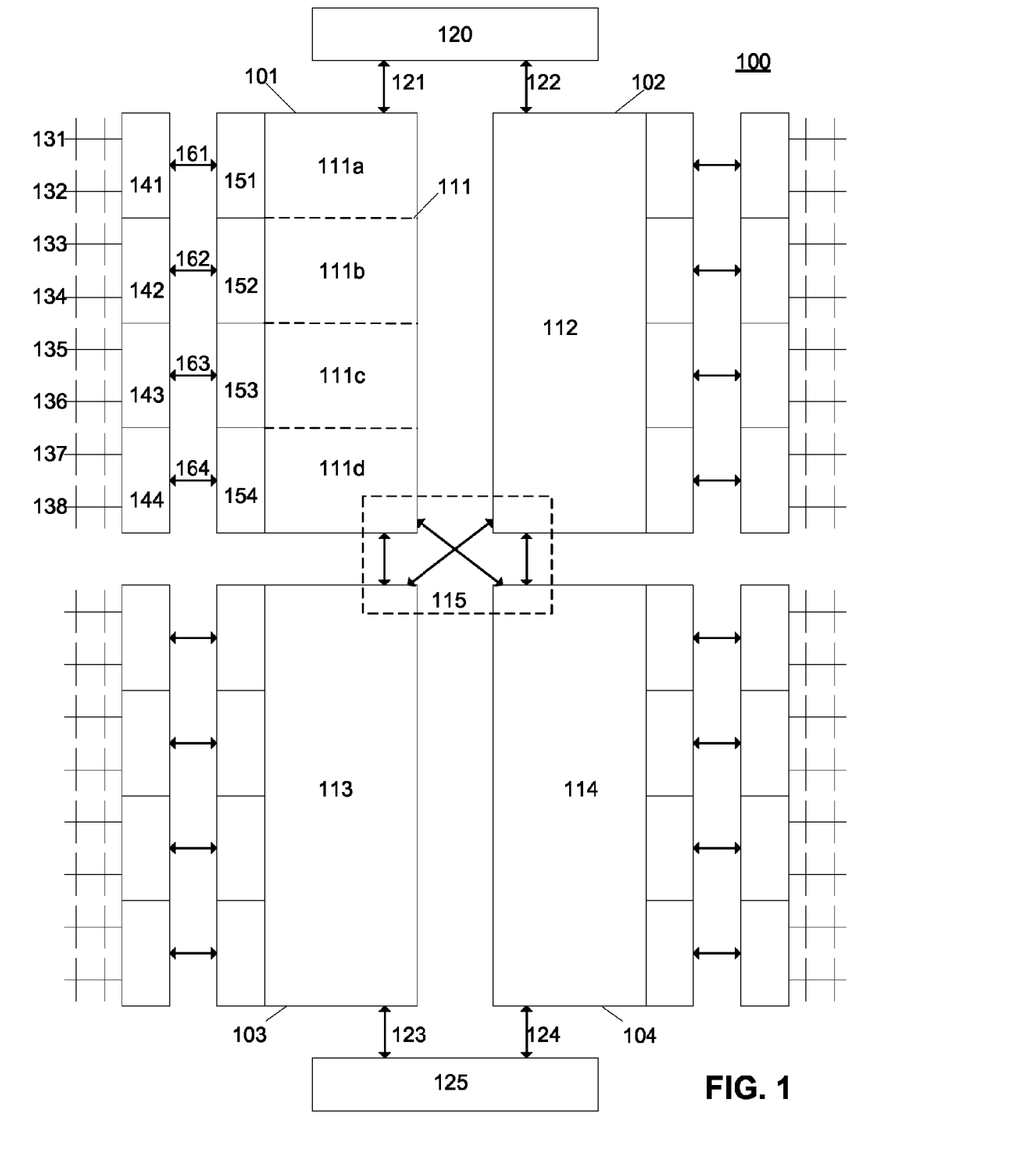
FIG. 1 is a block diagram of a server platform implementing an embodiment of the invention.

FIG. 1 is a block diagram of an embodiment of the invention. In this embodiment, system 100 is a 4 socket server platform, including processor sockets 101, 102, 103 and 104. Each socket may mechanically and operatively couple a multi-core processor to other components of system 100 (either shown in FIG. 1, or otherwise). In this embodiment, processor 111 utilizes socket 101, processor 112 utilizes socket 102, processor 113 utilizes socket 103 and processor 114 utilizes socket 104. Processor 111 is shown to comprise of cores 111a, 111b, 111c and 111d; it is to be understood that although not shown in the same level of detail, processors 112-114 each comprise 4-core processors in this embodiment. Processors 111-114 (i.e., the cores of each processor) may exchange data via socket-to-socket links 115.

In this embodiment, processors 111 and 112 are coupled to input/output hub (IOH) 120 via point-to-point links 121 and 122, respectively, while processors 113 and 114 are coupled to IOH 125 via point-to-point links 123 and 124, respectively. IOH 120 and IOH 125 provide connectivity between processors 111-114 and input/output (I/O) devices utilized by system 100 (not shown).

System 100 as illustrated is shown to have a large memory capacity. In this embodiment, each socket is assigned 8 memory channels—thus, each core of processors 111-114 is assigned two channels of memory devices (e.g., channels comprising dual inline memory modules (DIMMs) consistent with the JEDEC Double Data Rate (DDR3) dynamic random access memory (DRAM) standard, published July 2010), or any functional equivalent).

Thus, core 111a is assigned DIMM channels 131 and 132, core 111b is assigned DIMM channels 133 and 134, core 111c is assigned DIMM channels 135 and 136, and core 111d is assigned DIMM channels 137 and 138. Core 111a will access its DIMM channels via memory controller 151, core 111b will access its DIMM channels via memory controller 152, core 111c will access its DIMM channels via memory controller 153, and core 111d will access its DIMM channels via memory controller 154. The cores of processors 112-114 are shown to be similarly assigned to other channels of DIMMs in system 100.

It is to be understood that in some embodiments, sockets 101-104 may each have a limited number of CPU socket pins;

thus, in order to accommodate a large memory capacity with a limited number of CPU socket pins, memory bus expander buffers may be used. In this example, memory bus expander buffer 141 is coupled to DIMM channels 131 and 132, buffer 142 is coupled to DIMM channels 133 and 134, buffer 143 is coupled to DIMM channels 135 and 136, and buffer 144 is coupled to DIMM channels 137 and 138. Other memory bus expanders utilized by system 100 are shown to be similarly connected to two DIMM memory channels. Each DIMM memory channel as illustrated in FIG. 1 is shown to have two memory devices. This is shown only as an example of a plurality of memory devices on a channel; it is understood that each memory channel may comprise many more memory devices.

In this embodiment, the memory bus expander buffers of system 100 may be connected to their respective processor cores via high speed serial links; for example, buffer 141 is shown to be coupled to core 111*a* via link 161, buffer 142 is shown to be coupled to core 111*b* via link 162, buffer 143 is shown to be coupled to core 111*c* via link 163, and buffer 144 is shown to be coupled to core 111*d* via link 164. Said links may obey, for example, the Scalable Memory Interface (SMI) protocol which has a low pin count requirement.

It is to be understood that the combination of high memory capacity, memory bus expander buffers, and high speed serial links may result in high power consumption even when system platform 100 is completely idle. Thus, system 100 may reduce system memory idle power consumption by having various components of the memory subsystem enter and exit low power states based on various operating conditions.

It is understood that power management processes can adversely affect the life of links and components (e.g., links 161-164, memory buffer chips residing on DIMM channels 131-138) if they are power cycled at a high rate; furthermore, poorly designed power management processes may still not achieve reasonable power savings if the rate of entry and exit to a low-power state is very high (i.e., resulting in small "low power state residencies" in spite of the high energy cost of powering down and up). This is especially true for external links such as links 161-164 since the memory bus traffic is highly unpredictable due to its dependency on network I/O under low-load or idle-load conditions. Thus, power-management techniques that result in poor power savings or reduced life of a part/product must be avoided.

Embodiments of the invention will limit the power management of links, such as links 161-164. In one embodiment, operations alter system power management operations during an idle mode to improve power-savings and reliability. In other words, embodiments of the invention may determine whether to transition a link or a device into a low power state during a system low power mode (i.e., when said link or device is "qualified" to enter a low power state).

Figure 2:
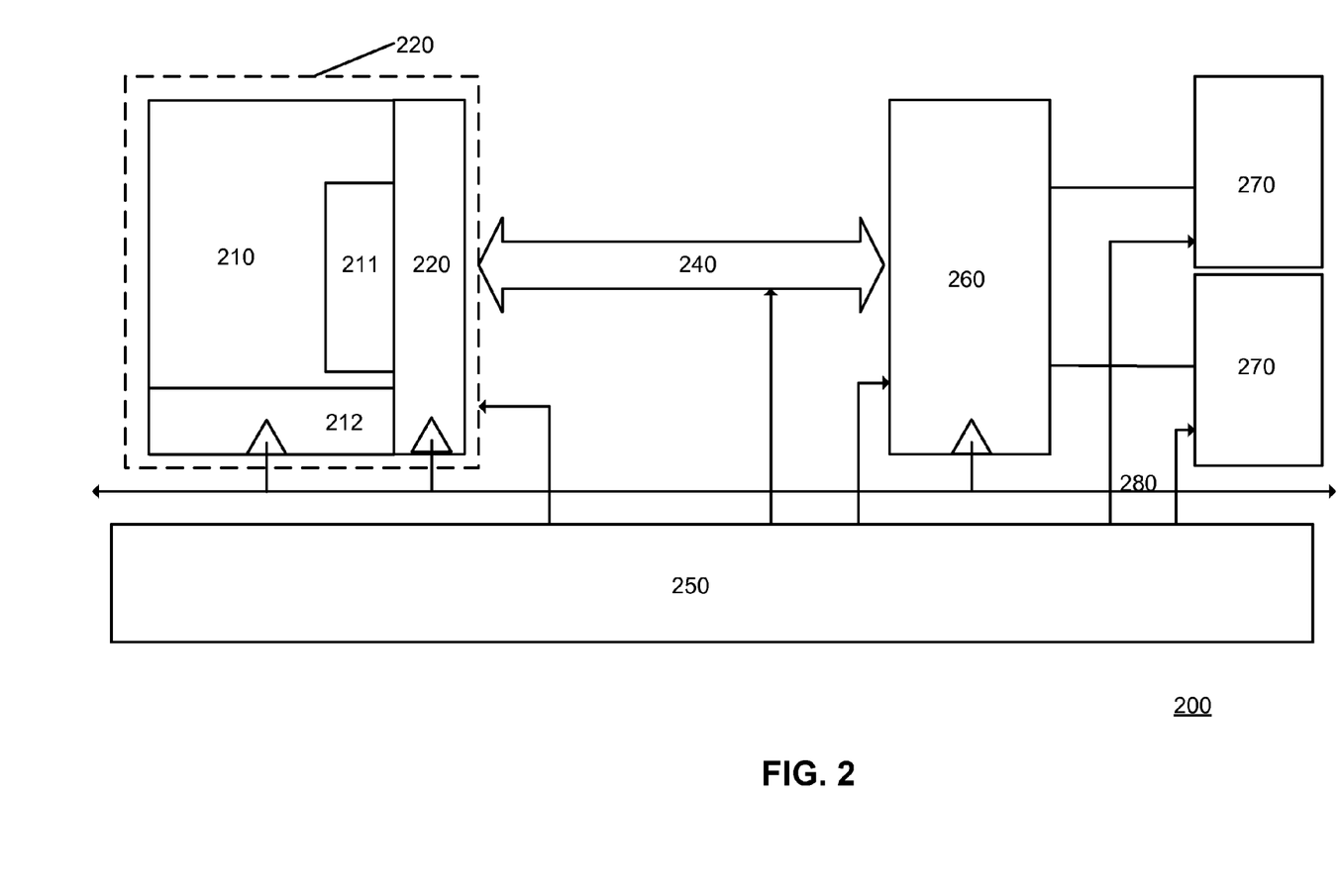
FIG. 2 is a block diagram of an embodiment of the invention.

FIG. 2 is a block diagram of an embodiment of the invention. In this embodiment, memory subsystem 200 is shown to include processor 210 coupled to the subsystem via socket 220. It is to be understood that processor 200 may be a single-core processor, or a core included in a multi-core processor (wherein other cores of the multi-core processor are coupled to the system platform via socket 220).

Processor 210 is shown to have a physical player (PHY) including transmission (TX) drivers 211 to drive output data from the processor, and phase lock loop (PLL) circuitry 212 to control an input clock signal for the processor (i.e., receiving a clock signal from system clock 280).

Processor 210 is further shown to execute memory controller module 220 to control data transferred to and from memory units 270. It is to be understood that in other embodiments, the memory controller may be logic/circuitry outside of processor 210. Memory bus expander buffer 260 is an interface for processor 210 to access DIMM channels 270 as described above. Processor 210 may receive data from buffer 260 via high speed serial link 240.

In this embodiment, memory subsystem 200 includes memory power management module 250 to execute a low-power idle state for various components of the subsystem in response to detecting a plurality of operating conditions. These conditions may include, for example, detecting that memory controller 220 is empty of transactions directed towards memory units 270; that processor 210 is executing a processor low-power mode; and that socket 220 is executing an idle mode. In embodiments where multi-core processors are utilized by the system platform, all processing cores of the respective multi-core processor may be required to be executing a processor low-power mode. In systems where multiple low-power modes may exist for a processor, embodiments of the invention may detect a specific low-power mode (e.g., a low-power mode that is exited in response to a system event, rather than a time-out).

In one embodiment of the invention, memory power management module 250, in response to detecting any combination of the above described operating conditions, executes a low power state. Said low power state may include the execution of operations to disable an input clock signal (alternatively referred to herein as "clock-gating") for memory controller 220. It is to be understood that such "clock-gating" operations would conserve power by preventing the sequential circuits of memory controller from switching states. Thus, memory controller 220 is disabled and prevented from processing transactions while other components are executing low-power idle states.

In one embodiment, the low-power state executed by memory power management module 250 may further execute operations to disable TX drivers 211, the input clock signal for processor 210, and PLL circuitry 212 in response to detecting the above described operating conditions. It is to be understood that such operations reduce the amount of power processor 210 consumes in the low power state.

In one embodiment of the invention, memory power management module may further execute operations to selectively disable high speed serial link 240 and disable an input clock signal for memory bus expander buffer 260 in response to detecting the plurality of operating conditions. It is to be understood that such operations reduce the amount of power the components would consume in the low power state.

In one embodiment, memory power management module 250 determines to enter a low power state for link 240 or a device (e.g., memory units 270) based, at least in part, on said link or device's previous "off-time" (i.e., how long did said link or device stay in a low-power state" during the previous execution of a system low power mode). It is to be understood that embodiments of the invention may therefore control the duty-cycle of said link or device by keeping said link or device in an "on state" in order to achieve the best idle-power and reliability for the system, even though the remainder of the system (i.e., memory subsystem 200) has entered a low-power state.

In the event that memory units 270 execute refresh operations to maintain their data integrity (e.g., memory units 270 comprise DRAM), memory power management module 250 may further direct the DRAM memory to execute a self-refresh mode in response to detecting the plurality of operating conditions. It is to be understood that such operations would maintain the data integrity of memory units 270 in the low power state without requiring memory controller 220 to manage the necessary refresh operations. In some embodiments, memory units 270 may comprise registered memory. Memory power management module 250 may further execute operations to disable an input clock signal for the register of each memory unit in response to detecting the plurality of operating conditions in order to further reduce the amount of power consumed by memory units 270 in the low power state.

Thus, when the host system is in an idle or near-idle state, components of memory subsystem 200 and components of the system interface (e.g., a power control unit, not shown) will enter into low-power states. In these states, memory power management module 250 may attempt to save as much idle power as possible by powering down memory links such as link 240. When link 240 is powered down, it consumes near zero-power, while, as described above, memory buffers 270 may execute a self-refresh mode in order to keep the memory contents alive. When the processor 210 exits its low-power state, or when a peripheral device initiates I/O traffic to the memory, memory power management module may bring link 240 out of the low-power state by powering it up and initializing it back to operating speed.

In one embodiment, system low power states are executed based on processor 210 and memory traffic idleness. These low-power states are exited based on traffic and memory access requests coming from local or remote agents, or interrupts (e.g., error interrupts, timer based interrupts). Furthermore, on systems with multiple memory channels, link 240 may exit a low power state in response to an interrupt, and this may force an exit on all the memory channels, while memory accesses may force only one link (corresponding to the memory to be accessed) to exit a low power state. Thus, it is to be understood that systems with multiple memory controllers and memory channels could see varying number of low power state transitions over time.

Frequent low power state transitions can adversely affect the life of links and components (e.g., memory buffer chips) if they are power cycled at a high rate; furthermore, it is understood that poorly designed power management processes may still not achieve reasonable power savings if the rate of entry and exit to a low-power state is very high (i.e., resulting in small "low power state residencies" in spite of the high energy cost of powering down and up). This is especially true for links such as link 240. Thus, power-management techniques that result in poor power savings or reduced life of a part/product must be avoided.

In one embodiment, memory power management module 250 tracks a time period that link 240 is disabled (herein referred to as link 'OFF-TIME') and a time period that link 240 is enabled (herein referred to as link 'ON-TIME').

Thus, memory power management module 250 is shown to execute a low-power state for memory subsystem 200 in response to detecting certain operating conditions. It is to be understood that said low-power state may include any combination of the above described examples, thereby reducing memory subsystem idle power consumption compared to prior art solutions. During the above described low power state for memory subsystem 200, memory power management module 250 may determine whether to disable link based 240, at least in part, on the tracked OFF-TIME and ON-TIME values to ensure a duty cycle for the link that will prolong its life. For example, memory power management module 250 may disable link 240 only if its ON-TIME exceeds a threshold value determined by its OFF-TIME.

In one embodiment, memory power management module 250 controls the ON-TIME based on the previous OFF-TIME. There may be upper and lower limits to the computed ON-TIME, referred to herein as 'PEAK' and 'FLOOR.' The ON-TIME which gets computed will be in the range between PEAK and FLOOR.

In one embodiment, ON-TIME is determined based on the following equations

If OFF-TIME<PEAK:ON-TIME=MAX(PEAK,2*(PEAK−OFF-TIME))

If OFF-TIME>=PEAK:ON-TIME=MAX(FLOOR,2*(PEAK−OFF-TIME)).

It is to be understood that using the above equations to adjust the ON-TIME based on the previous OFF-TIME ensures a duty cycle to prolong the life of link 240 (e.g., 50%) is always maintained.

Figure 3A:
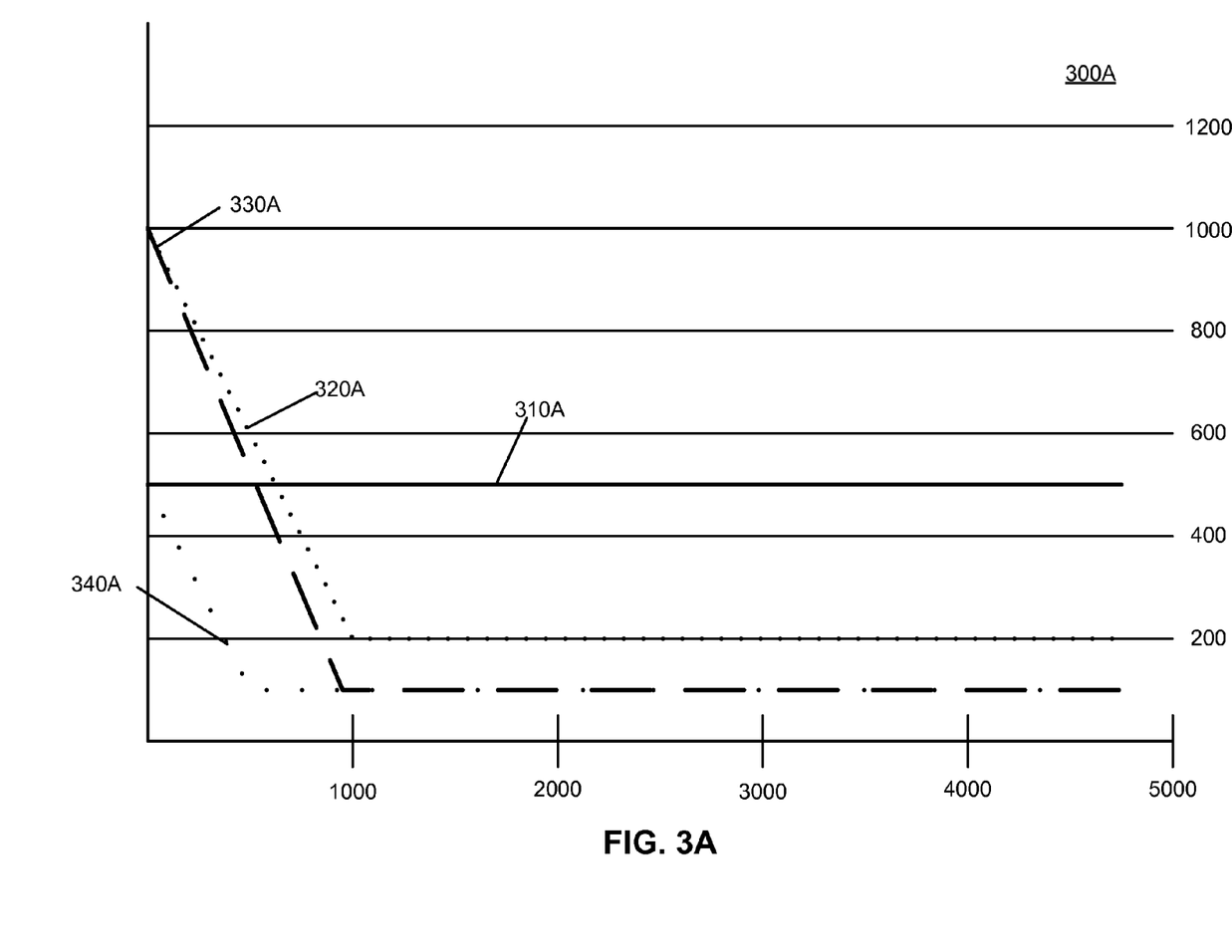
FIG. 3A and FIG. 3B are line graphs illustrating performances of embodiments of the invention.
Figure 3B:
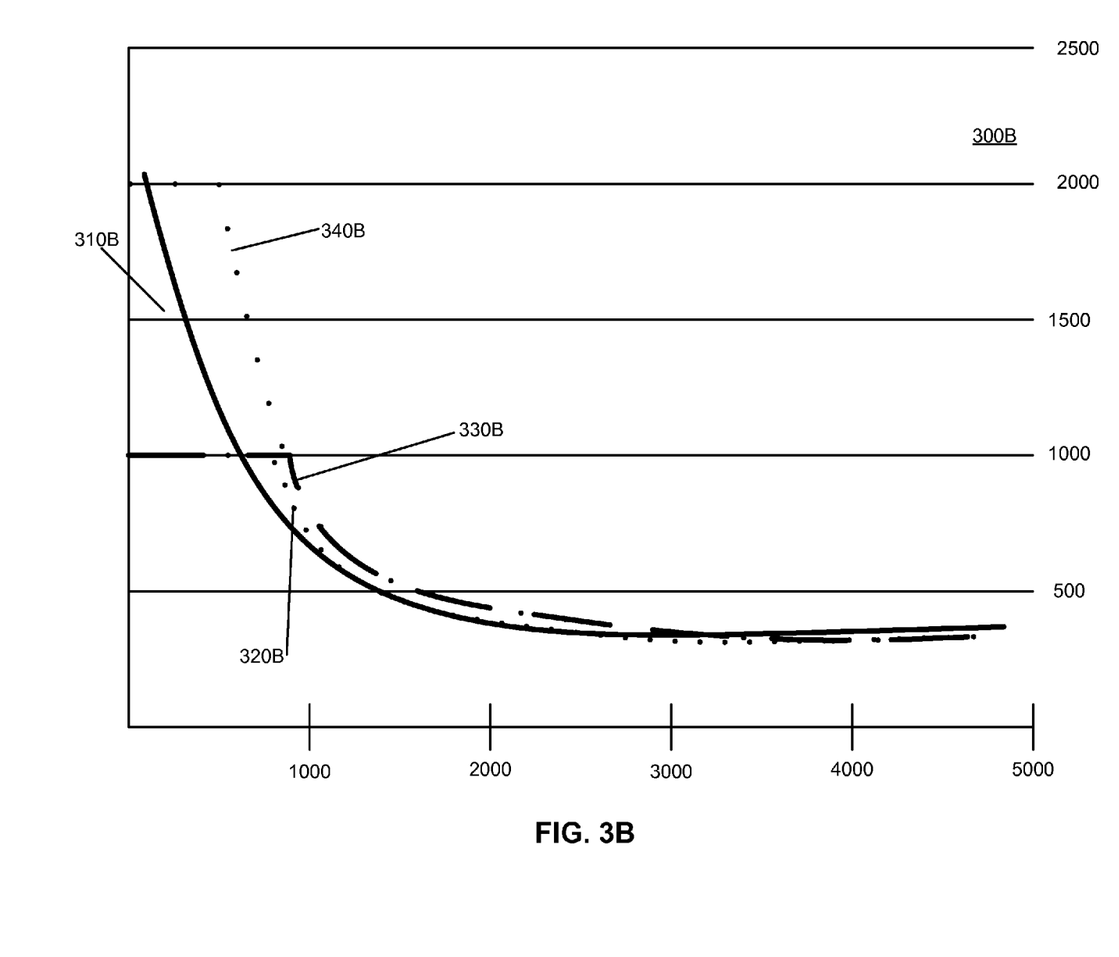

FIG. 3A and FIG. 3B are line graphs illustrating performances of embodiments of the invention. Graph 300A is graph of link on-time vs. link off-time, according to embodiments of the invention. Graph 300A includes curve 310A, which shows a constant ON-TIME value no matter the OFF-TIME value, and curves 320A, 330A and 340A, which show ON-TIME vs. OFF-TIME curves for different values of PEAK and FLOOR using the above described equations.

In this example, curve 320A is based on PEAK value of 500 and a FLOOR value of 200; curve 330A is based on a PEAK value of 500 and a FLOOR value of 100; and curve 340A is based on PEAK value of 250 and a FLOOR value of 100.

It can be seen from the above described curves that the maximum ON-TIME value is twice the respective PEAK value (i.e., 2*PEAK−(0)), while the minimum ON-TIME value is the respective FLOOR value. Thus, the corresponding memory link will have an ON-TIME of at least the FLOOR value, and the link will not enter a low-power state unless it has been on for at least the FLOOR value (or higher, as shown in curves 320A-340A).

Graph 300B is a graph of link low-power rates (i.e., KILL rates) vs. link off-time, according to embodiments of the invention. Graph 300B includes curve 310B, which corresponds to curve 310A described above; curve 320B, which corresponds to curve 320A described above; curve 330B, which corresponds to curve 330A described above; and curve 340B, which corresponds to curve 340A described above.

Thus, embodiments of the invention provide ideal power management by increasing the ON-TIME if the OFF-TIME is smaller than what is required for a target duty cycle (e.g., 50%), or by decreasing the ON_TIME if the OFF-TIME is larger than what is required for the target duty cycle, wherein the ON-TIME value is limited by PEAK and FLOOR values.

Figure 4A:
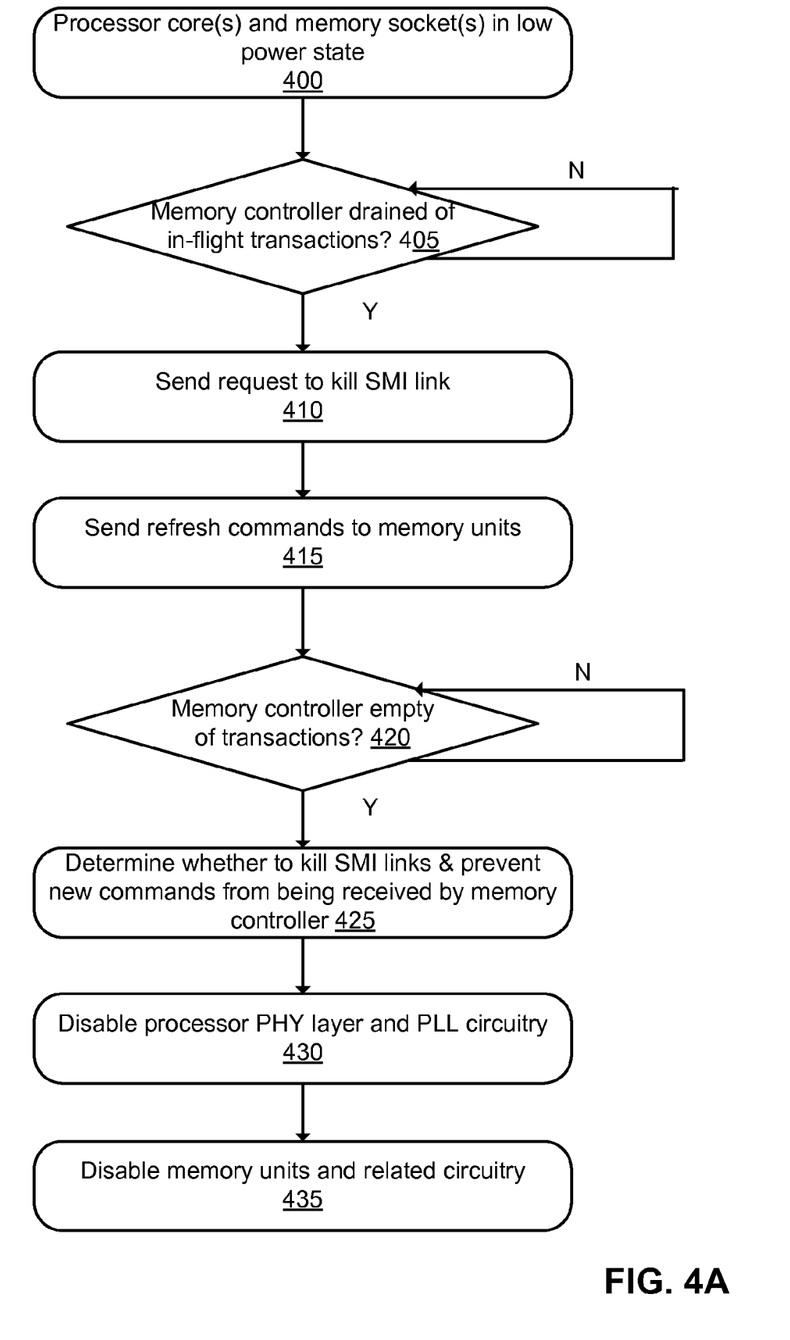
FIG. 4A and FIG. 4B are flow diagrams illustrating embodiments of the invention

FIG. 4A is a flow diagram illustrating an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

All processing cores in a computing system, and all associated memory sockets, are determined to be in a low power state, 400. A system memory controller is queried to determine if it has been drained of all in-flight (i.e., pending) transactions, 405. If so, a request to disable (i.e., kill) the SMI links between processing cores and memory units may be sent to the memory controller, 410. The memory controller may further quiesce the ranks (i.e., channels) of memory units by sending refresh commands to all populated ranks, 415.

Any transactions in the memory controller will be processed, 420; however, if the memory controller is emptied, a low power state for the memory subsystem may be initiated. The memory controller may determine whether to execute the request to disable the SMI links as described above, and prevent new commands from being issued to the memory controller 425. In some embodiments, the memory controller will be "clock gated."

Circuitry related to data transmissions to/from the processor may further be disabled, 430. In one embodiment, TX drivers are shutdown, while PLL circuitry of the processor is clock gated.

Memory unit components may further be disabled, 435. In one embodiment, core logic of the memory bus expander buffer is clock gated, I/O circuitry and any link circuitry between the memory and the processor is shut down (if the request to kill the SMI link was executed), and (if needed) the memory is placed in a self-refresh state.

Figure 4B:
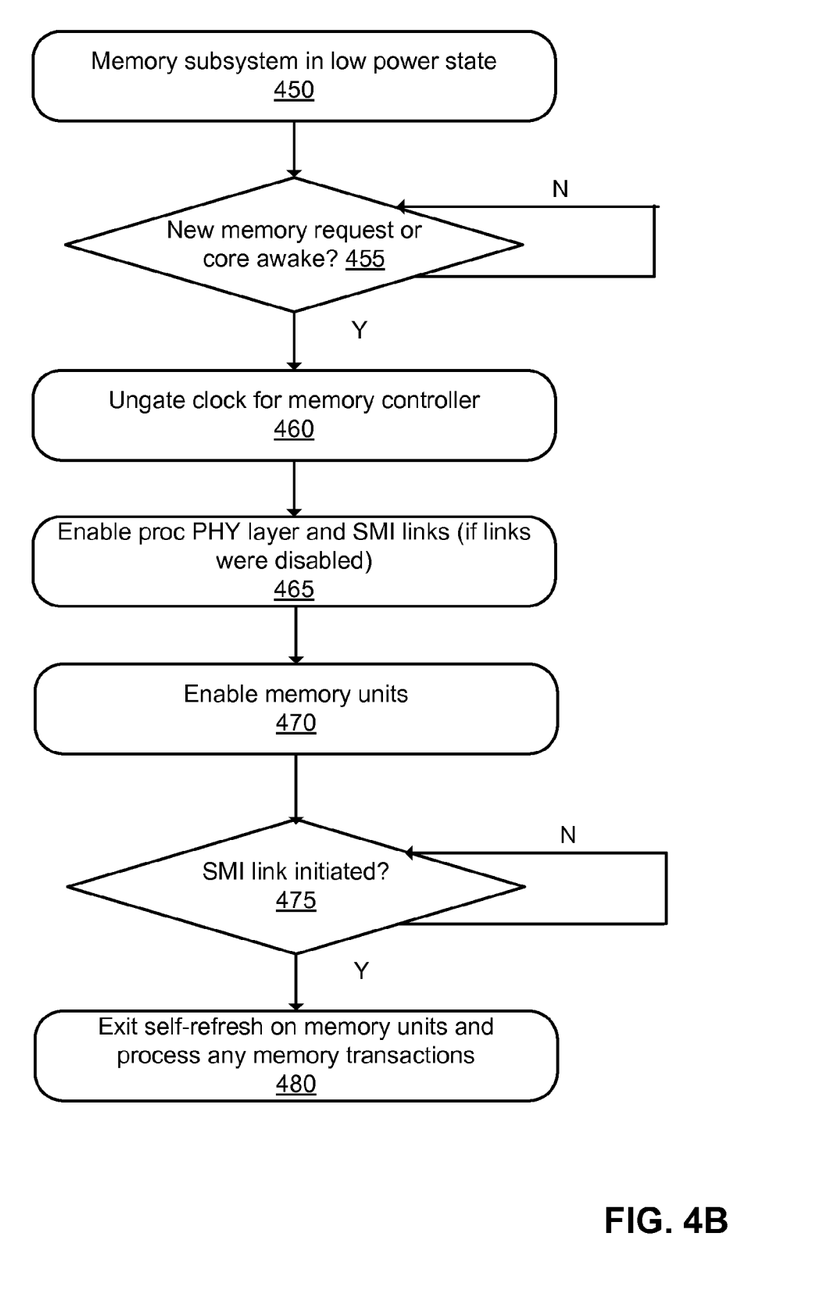

Thus the above operations describe how a memory subsystem may enter a low power state, and operations said low power state may include. FIG. 4B is a flow diagram illustrating an embodiment of the invention for exiting a low power state for a memory subsystem. When the memory subsystem is in a low power state (e.g., any low power state described above), 450, it is determined whether an exit condition has occurred. In this embodiment, an exit condition occurs if there are new memory requests, or if a processing core has exited a low power state, 455. If there are no new memory access requests and all processing cores are in a low power state, the memory subsystem continues to execute a low power state. Otherwise, the input clock signal of the memory controller may be ungated, 460, circuitry related to data transmissions to/from the processor may be enabled, 465, and memory unit components and related circuitry may further be enabled, 470. In one embodiment, if the SMI link was in fact disabled, the amount of time is recorded for future low-power management operations (e.g., see the above described 'OFF-TIME').

It is then determined if the high speed serial link has been initialized, 475. If so, the DRAM memory ranks are configured to exit self-refresh and the memory controller will process transactions as they are received, 480.

Figure 5:
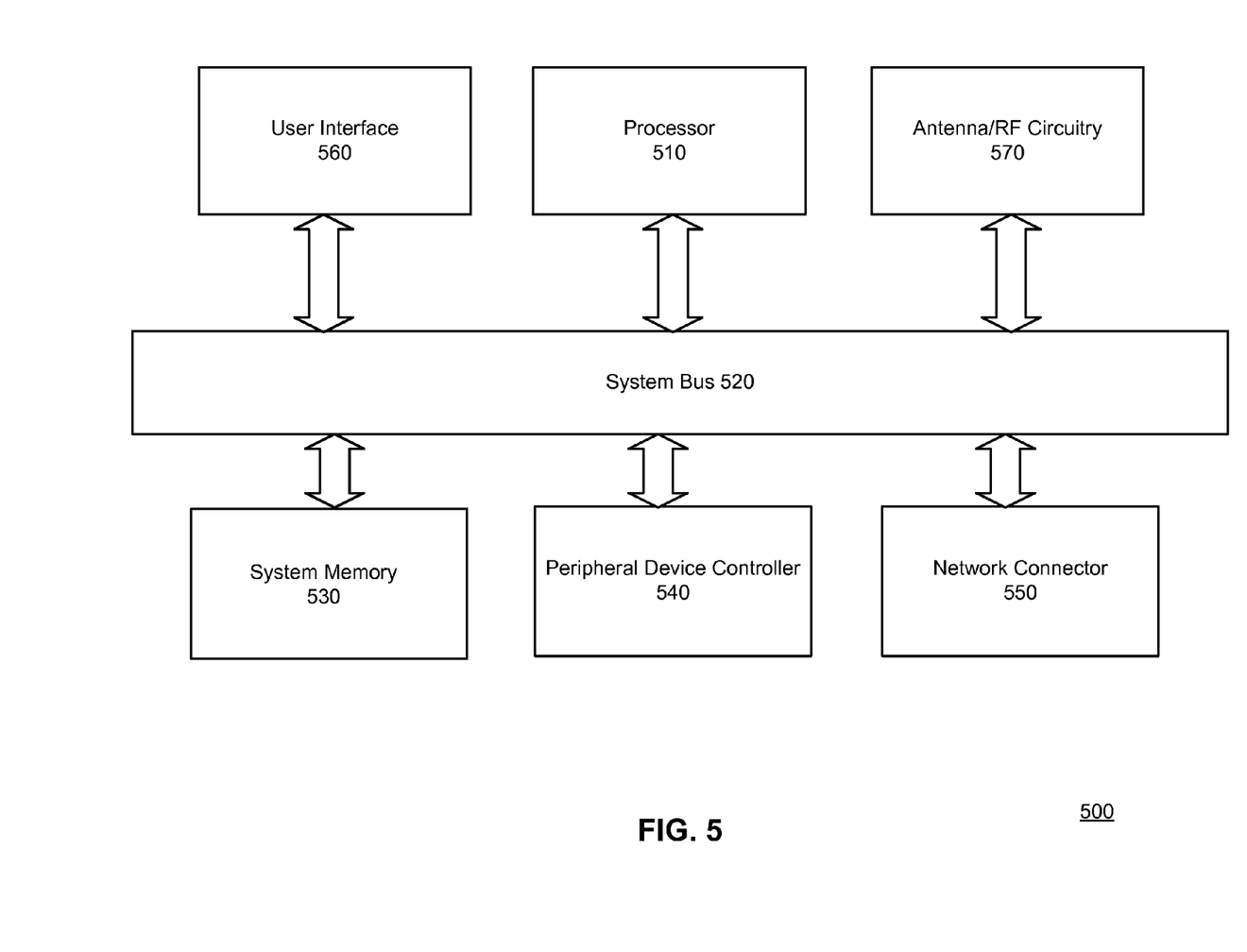
FIG. 5 is block diagram of a system that may utilize an embodiment of the invention.

FIG. 5 is block diagram of a system that may utilize an embodiment of the invention. System 500 may describe a server platform, or may be included in, for example, a desktop computer, a laptop computer, a tablet computer, a netbook, a notebook computer, a personal digital assistant (PDA), a server, a workstation, a cellular telephone, a mobile computing device, an Internet appliance, an MP3 or media player or any other type of computing device.

System 500 may include processor 510 to exchange data, via system bus 520, with user interface 560, system memory 530, peripheral device controller 540 and network connector 550. System memory 530 comprises volatile and non-volatile memory and may be included in a memory subsystem, wherein the memory subsystem may enter a low-power state and the power management of the memory links will be executed according to any of the above described embodiments of the invention. Thus, system 500 will have a lower idle power consumption and more effective link power management compared to systems employing prior art system memory solutions.

System 500 may further include antenna and RF circuitry 570 to send and receive signals to be processed by the various elements of system 500. The above described antenna may be a directional antenna or an omni-directional antenna. As used herein, the term omni-directional antenna refers to any antenna having a substantially uniform pattern in at least one plane. For example, in some embodiments, said antenna may be an omni-directional antenna such as a dipole antenna, or a quarter wave antenna. Also for example, in some embodiments, said antenna may be a directional antenna such as a parabolic dish antenna, a patch antenna, or a Yagi antenna. In some embodiments, system 500 may include multiple physical antennas.

While shown to be separate from network connector 550, it is to be understood that in other embodiments, antenna and RF circuitry 570 may comprise a wireless interface to operate in accordance with, but not limited to, the IEEE 802.11 standard and its related family, Home Plug AV (HPAV), Ultra Wide Band (UWB), Bluetooth, WiMax, or any other form of wireless communication protocol.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
monitoring a high speed serial link transferring data between a memory unit and a socket coupling a processing core and the memory unit to determine a first value representing a time period that the high speed serial link is disabled and a second value representing a time period that the high speed serial link is enabled;
detecting a plurality of operating conditions in a computer system, including
a memory controller is empty of transactions directed towards the memory unit,
the processor core is executing a processor low-power mode, and
the socket is executing an idle mode; and
in response to detecting the plurality of operating conditions, executing a low-power idle state for the computer system, the low power state to include operations to determine to disable the high speed serial link based, at least in part, on the first and second values.

2. The method of claim 1, wherein determining to disable the high speed serial link based, at least in part, on the first and second values comprises determining to disable the high speed serial link if the second value exceeds a threshold value based on the first value.

3. The method of claim 2, wherein the threshold value comprises two times a peak link on-time value minus the first value if the first value is less than the peak link on-time value.

4. The method of claim 2, wherein the threshold value comprises a maximum of a floor link on-time value and two times a peak link on-time value minus the first value if the first value is greater than or equal to the peak link on-time value.

5. The method of claim 1, further comprising:
exiting the low-power idle state for the memory unit in response to detecting at least one of a transaction directed towards the memory unit, and the processor core exiting the processor low-power mode, wherein executing the low-power state includes determining the first value representing the time period that the high speed serial link is disabled if the high speed serial link was disabled during the low-power idle state.

6. The method of claim 1, further comprising:
disabling an input clock signal for the memory controller in response to detecting the plurality of operating conditions.

7. The method of claim 1, the processor core included in a processor package further including transmission (TX) drivers to drive output data from the processor core, and phase lock loop (PLL) circuitry to control an input clock signal for the processor core, the method further comprising:
disabling the TX drivers, the input clock signal for the processor core, and the PLL circuitry in response to detecting the plurality of operating conditions.

8. A system comprising:
a processor;
a memory unit;
a socket operatively coupling the processor to the memory unit;
a memory controller to control data transferred to and from the memory unit; and
a memory power management module to
monitor a high speed serial link transferring data between the memory unit and the socket to determine a first value representing a time period that the high speed serial link is disabled and a second value representing a time period that the high speed serial link is enabled,
detect a plurality of operating conditions, including
the memory controller is empty of transactions directed towards the memory unit, the processor is executing a processor low-power mode, and
the socket is executing an idle mode, and
in response to detecting the plurality of operating conditions, execute a low-power idle state for the computer system, the low power state to include operations to determine to disable the high speed serial link based, at least in part, on the first and second values.

9. The system of claim 8, wherein determining to disable the high speed serial link based, at least in part, on the first and second values comprises determining to disable the high speed serial link if the second value exceeds a threshold value based on the first value.

10. The system of claim 9, wherein the threshold value comprises two times a peak link on-time value minus the first value if the first value is less than the peak link on-time value.

11. The system of claim 9, wherein the threshold value comprises a maximum of a floor link on-time value and two times a peak link on-time value minus the first value if the first value is greater than or equal to the peak link on-time value.

12. The system of claim 8, the memory power management module to further:
exit the low-power idle state for the memory unit in response to detecting at least one of a transaction directed towards the memory unit, and the processor core exiting the processor low-power mode, wherein executing the low-power state includes determining the first value representing the time period that the high speed serial link is disabled if the high speed serial link was disabled during the low-power idle state.

13. The system of claim 8, the memory power management module to further:
disable an input clock signal for the memory controller in response to detecting the plurality of operating conditions.

14. The system of claim 8, the processor core included in a processor package further including transmission (TX) drivers to drive output data from the processor core, and phase lock loop (PLL) circuitry to control an input clock signal for the processor core, the memory power management module to further:
disable the TX drivers, the input clock signal for the processor core, and the PLL circuitry in response to detecting the plurality of operating conditions.

15. An apparatus comprising:
a processor;
a memory unit;
a socket operatively coupling the processor to the memory unit;
a memory controller to control data transferred to and from the memory unit; and
logic to
monitor a high speed serial link transferring data between the memory unit and the socket to determine a first value representing a time period that the high speed serial link is disabled and a second value representing a time period that the high speed serial link is enabled,
detect a plurality of operating conditions, including
the memory controller is empty of transactions directed towards the memory unit, the processor is executing a processor low-power mode, and
the socket is executing an idle mode, and
in response to detecting the plurality of operating conditions, execute a low-power idle state for the computer system, the low power state to include operations to determine to disable the high speed serial link based, at least in part, on the first and second values.

16. The apparatus of claim 15, wherein determining to disable the high speed serial link based, at least in part, on the first and second values comprises determining to disable the high speed serial link if the second value exceeds a threshold value based on the first value.

17. The apparatus of claim 15, wherein the threshold value comprises two times a peak link on-time value minus the first value if the first value is less than the peak link on-time value.

18. The apparatus of claim 16, wherein the threshold value comprises a maximum of a floor link on-time value and two times a peak link on-time value minus the first value if the first value is greater than or equal to the peak link on-time value.

19. The apparatus of claim 15, the logic to further:
exit the low-power idle state for the memory unit in response to detecting at least one of a transaction directed towards the memory unit, and the processor core exiting the processor low-power mode, wherein executing the low-power state includes determining the first value representing the time period that the high speed serial link is disabled if the high speed serial link was disabled during the low-power idle state.

20. The apparatus of claim 15, the logic to further:
disable an input clock signal for the memory controller in response to detecting the plurality of operating conditions.

* * * * *